Patented Oct. 14, 1947

2,429,018

UNITED STATES PATENT OFFICE 2,429,018

NITRILE COPOLYMERS

James D. D'Ianni, Akron, Ohio, assignor to Wingfoot Corporation, Akron, Ohio, a corporation of Delaware No Drawing. Application May 12, 1942, Serial No. 442,581

6 Claims. (Cl. 260—84)

This invention relates to an improved method of making polymerized masses and, more particularly, to a method involving the reaction of an alcohol and a vinyl cyanide in such manner that an interpolymer of two polymerizable substances is obtained directly from the reaction medium.

In the preparation of polymerized materials for various purposes, it has been found that copolymers of two or more monomeric substances often have properties which are not possessed by self-polymers, i. e., masses obtained by the polymerization of one substance. In order to produce these copolymers, it is necessary first to obtain the monomers by synthesis or other chemical procedure, a preparational procedure being ordinarily required for each monomer involved. In accordance with the principles of this invention, however, a method has been devised by which, in the production of certain interpolymers, the number of steps necessary in proceeding from available starting materials to the final product has been greatly reduced, with consequent economy of time and equipment. The class of copolymers which can be prepared by the practice of the invention are those resulting from the interaction of an alcohol and a vinyl cyanide in the presence of a catalyst and probably contain an acrylic acid ester interpolymerized with a vinyl cyanide or acrylonitrile.

To obtain these copolymers, a vinyl cyanide is reacted with an alcohol in an aqueous acidic medium, such as that provided by a solution of a mineral acid in water. Besides acids, other suitable catalysts can be employed, the function of the catalyst being to hydrolyze the nitrile radical of the vinyl cyanide to a carboxyl group. Immediately thereafter and in the same medium, the carboxylic acid is esterified with the alcohol. The acrylic esters so formed simultaneously polymerize with a portion of the original nitrile, and possibly with themselves, to give interpolymers which can be dissolved in organic solvents and cast into films. Apparently, all of the vinyl cyanide or acrylonitrile is not hydrolyzed since the polymer which is obtained shows by nitrogen analysis that a quantity of acrylonitrile is present, say on the order of 20%, although this may be more or less, depending on the proportions in which the alcohol and the cyanide are originally present and on the time and temperature of the reaction.

However, the conditions of the reaction are such that a substantial proportion of the vinyl cyanide is hydrolyzed and converted to an ester, a temperature of 100–150° C., and preferably 100–125° C. being adequate. The time of reaction may be several hours but usually 3–5 hours is sufficient. The medium in which the reaction is conducted is preferably acid, the acid being provided by mineral acids such as sulfuric, hydrochloric and phosphoric or by other fairly strong acids, such as chloracetic acid. Enough acid should be present to combine with the ammonia which is released by hydrolysis of the cyanide radical.

To illustrate the method, the following example is given, but it will be understood that the invention is not limited to the procedure or conditions set forth therein.

To a mixture of 75 cc. of ethyl alcohol and 82 cc. of concentrated sulfuric acid (specific gravity 1.84) was added 53 grams of vinyl cyanide or acrylonitrile. One third of the cyanide was added at room temperature and the remainder at 100–120° C. in the course of an hour's time. After heating for 30 minutes at 125° C., 88 cc. of ethyl alcohol and 18 cc. of water were added. Heating on an oil bath was continued for an additional 2½ hours at a temperature of 100–110° C. Thereafter, the cooled reaction product was poured into water and there separated a white polymeric mass of taffy-like consistency which was elastic. The air-dried product, amounting to 62 grams, was insoluble in benzene, gasoline, alcohol and acetone but was readily soluble in glacial acetic acid, from which films could be cast. Nitrogen analysis indicated that the product contained about 20% of acrylonitrile. It was a copolymer of vinyl cyanide and ethyl acrylate.

The method can be applied to the interaction of other alcohols and other vinyl cyanides so as to obtain polymerized masses therefrom. For example, in place of vinyl cyanide may be employed alpha methyl vinyl cyanide, alpha ethyl vinyl cyanide, alpha chloro vinyl cyanide, and alpha bromo vinyl cyanide. Likewise, the ethyl alcohol may be replaced by others, such as methyl, propyl, isopropyl, butyl, isobutyl and amyl alcohols.

I claim:

1. A method of preparing polymerized materials which comprises converting part of a material selected from the group consisting of acrylonitrile, alpha alkyl acrylonitriles and alpha halo acrylonitriles to an acrylate by heating the material in the presence of sulfuric acid, water and a monohydric saturated primary aliphatic alcohol having not more than five carbon atoms, continuing heating the reaction mixture until the acrylate and unconverted material have copolymerized and separating the polymerized material from the reaction mixture.

2. A method of preparing polymerized materials which comprises converting part of a material selected from the group consisting of acrylonitrile, alpha alkyl acrylonitriles and alpha halo acrylonitriles to an acrylate by heating the material at a temperature between about 100° C. and about 150° C. in the presence of sulfuric acid, water and a monohydric saturated primary aliphatic alcohol having not more than five carbon atoms, continuing heating the reaction mixture until the acrylate and unconverted material have copolymerized and separating the polymerized material from the reaction mixture.

3. A method of preparing polymerized materials which comprises converting about 80 percent of a material selected from the group consisting of acrylonitrile, alpha alkyl acrylonitriles and alpha halo acrylonitriles to an acrylate by heating the material at a temperature between about 100° C. and about 150° C., in the presence of sulfuric acid, water and a monohydric saturated primary aliphatic alcohol having not more than five carbon atoms, continuing heating the reaction mixture until the acrylate and unconverted material have copolymerized and separating the polymerized material from the reaction mixture.

4. A method of preparing polymerized materials which comprises converting part of a material selected from the group consisting of acrylonitrile, alpha alkyl acrylonitriles and alpha halo acrylonitriles to an acrylate by heating the material in the presence of sulfuric acid, water and ethyl alcohol, continuing heating the reaction mixture until the acrylate and unconverted material have copolymerized and separating the polymerized material from the reaction mixture.

5. A method of preparing polymerized materials which comprises converting part of a material selected from the group consisting of acrylonitrile, alpha alkyl acrylonitriles and alpha halo acrylonitriles to an acrylate by heating the material at a temperature between about 100° C. and about 150° C. in the presence of sulfuric acid, water and ethyl alcohol, continuing heating the reaction mixture until the acrylate and unconverted material have copolymerized and separating the polymerized material from the reaction mixture.

6. A method of preparing polymerized materials which comprises converting about 80 percent of a material selected from the group consisting of acrylonitrile, alpha alkyl acrylonitriles and alpha halo acrylonitriles to an acrylate by heating the material at a temperature between 100° C. and 150° C. in the presence of sulfuric acid, water and ethyl alcohol, continuing heating the reaction mixture until the acrylate and unconverted material have copolymerized and separating the polymerized material from the reaction mixture.

JAMES D. D'IANNI.

REFERENCES CITED

The following references are of record in the file of this patent:

UNITED STATES PATENTS

| Number | Name | Date |
|---|---|---|
| 2,234,076 | Gumlich et al. | Mar. 4, 1941 |
| 2,240,730 | Voss et al. | May 6, 1941 |
| 2,332,899 | D'Alelio | Oct. 26, 1943 |
| 2,333,635 | Britton | Nov. 9, 1943 |

FOREIGN PATENTS

| Number | Country | Date |
|---|---|---|
| 371,396 | Great Britain | Apr. 14, 1932 |
| 715,961 | France | Oct. 5, 1931 |
| 655,570 | Germany | Jan. 19, 1938 |